US005598151A

United States Patent [19]

Torii, Jr.

[11] Patent Number: 5,598,151

[45] Date of Patent: Jan. 28, 1997

[54] FIREARM SECURITY SYSTEM AND ACCESS LOCK THEREFOR

[76] Inventor: Dennis R. Torii, Jr., 122 State St., Brooklyn, N.Y. 11201

[21] Appl. No.: 382,536

[22] Filed: Feb. 2, 1995

Related U.S. Application Data

[63] Continuation-in-part of Ser. No. 986,433, Dec. 4, 1992, Pat. No. 5,416,472.

[51] Int. Cl.[6] .................... G06F 7/04

[52] U.S. Cl. .................... 340/825.32; 340/825.31; 340/825.45; 340/568; 340/539

[58] Field of Search .................... 340/825.32, 825.31, 340/825.3, 825.45, 825.44, 533, 542, 539, 573, 568, 570; 70/14, 57, 58, 63; 206/317; 49/22, 45, 38, 54, 53; 312/215, 242; 211/64, 8, 9; 224/243; 109/38, 25

[56] References Cited

U.S. PATENT DOCUMENTS

| | | | |
|---|---|---|---|
| 2,797,405 | 6/1957 | Stelter | 340/274 |
| 2,958,423 | 11/1960 | Caloiero et al. | 211/4 |
| 3,115,765 | 12/1963 | Fengler | 70/315 |
| 3,478,344 | 11/1969 | Schwitzgebel et al. | 340/825.44 |
| 3,530,451 | 9/1970 | Devine | 340/539 |
| 3,731,818 | 5/1973 | Young | 206/16 R |
| 3,881,171 | 4/1975 | Moorman et al. | 340/164 |
| 4,018,339 | 4/1977 | Pritz | 211/8 |
| 4,021,796 | 5/1977 | Fawcett, Jr. et al. | 340/274 |
| 4,236,148 | 11/1980 | Gurvis | 340/568 |
| 4,268,823 | 5/1981 | Rauchut et al. | 340/570 |
| 4,333,074 | 6/1982 | Sutherland et al. | 340/825 |
| 4,637,237 | 1/1987 | Witkoski et al. | 70/285 |
| 4,663,621 | 5/1987 | Field et al. | 340/825 |
| 4,747,280 | 5/1988 | Shaw | 70/279 |
| 4,760,393 | 7/1988 | Mauch | 340/825 |
| 4,768,021 | 8/1988 | Ferraro | 340/568 |
| 4,877,131 | 10/1989 | Patros et al. | 206/317 |
| 5,108,019 | 4/1992 | Woodward et al. | 224/243 |
| 5,111,755 | 5/1992 | Rouse | 109/25 |
| 5,118,175 | 6/1992 | Costello | 312/242 |
| 5,161,396 | 11/1992 | Loeff | 70/63 |
| 5,218,344 | 6/1993 | Ricketts | 340/573 |

*Primary Examiner*—Edwin C. Holloway, III
*Attorney, Agent, or Firm*—Pennie & Edmonds

[57] ABSTRACT

A security system for the containment of at least one firearm in a repository, which operates in conjunction with an alarm system adapted to generate a signal upon the emergency or unauthorized opening of the repository indicative access to and possible removal of the firearm contained therein. An alarm system generates a signal at a remote location is indicative as to whether the firearm in the repository has been accessed and/or removed either in an intended manner or under emergency and/or duress conditions. Also disclosed is a particular pushbutton lock mechanism suitable for use with a security system of the type disclosed herein.

20 Claims, 14 Drawing Sheets

FIREARM SECURITY SYSTEM AND ACCESS LOCK THEREFOR

CROSS REFERENCE TO RELATED APPLICATIONS

This application is a continuation-in-part of application Ser. No. 07/986,433 filed Dec. 4, 1992, now U.S. Pat. No. 5,416,472.

BACKGROUND OF THE INVENTION

1. Field of the Invention

The present application relates to a repository for firearms and, more particularly, to a security system for the containment of at least one firearm in a repository which operates in conjunction with an alarm adapted to generate a signal upon opening of the repository indicative of access to and possible removal of the firearm contained therein.

2. Background Art

The proliferation of registered firearms, such as handguns, rifles and shotguns, in the possession of the general public has, in recent years, dramatically increased the necessity of providing secure repositories or safe storage for such firearms or weapons when these are not in use. Portable firearms of this type are currently adapted to be stored in a wide variety of containers, strongboxes, safes and rifle racks, depending upon the kind of firearm. The firearms are locked in these containers to inhibit unauthorized or unlawful access thereto.

Various types of mechanical locking means have been devised for restricted access storage receptacles in which materials of a confidential or dangerous nature are kept. The types of locking devices designed for the security of storage receptacles, specifically those devices which operate mechanically, are limited to perform the single action of unlocking to provide access to the contents of the receptacle. One such device is the permutation lock, one form of which is the common pushbutton lock. Push-button mechanical locking devices have been further developed as a means of security adaptable to location entry access and storage receptacle access. Requiring the entry of an access code, locking devices of this type eliminate the necessity of a key although many of these type devices provide the option as a means of bypassing code entering. The prior art of this type of locking device does not provide for the ability to be unlocked by several codes. The purpose of this feature is to enable the lock to perform two functions simultaneously. The primary function which takes place when an access code has been entered and an actuator knob has been turned is the unlocking of the lock itself. The secondary function which occurs simultaneously with the primary function is that part(s) of the inner lock will protrude from the lock itself to act as an actuating contact to any mechanical or electrical system that is designed to be used by this specific type of lock.

In and attempt to provide adequate, or at least substantially effective, safeguards against the removal of firearms from safes, strongboxes or similar type of repositories, particularly under unauthorized or unlawful circumstances, various types of security systems have been developed in the technology which will afford an indication, such as an alarm or the like, that actual or attempted access has been made to the stored firearm.

Thus, Ferraro U.S. Pat. No. 4,768,021 discloses a safe for a weapon, such as a loaded handgun, in which a box-like container having a hinged closure member is adapted to receive the firearm, and in which the closure member is automatically locked when in its closed position on the container. In order to gain access to the weapon contained in the safe, a keypad is provided thereon which, upon the entry of a specific sequence of numbers or letters, or upon fingerprint identification, will correlate with a preprogrammed sequence of such numbers or letters, or fingerprints, and thereby effectuate opening of the safe and allow for access to the weapon contained therein. Although the foregoing structure provides for a relatively secure storage of the weapon or firearm, an alarm is triggered only in the event that an incorrect program is entered and/or a forcible entry is attempted to the safe, thereby indicating that the weapon or firearm is in process of being removed by an unauthorized person.

Shaw U.S. Pat. No. 4,747,280 discloses a lock device for a rifle rack, in which a timing device constituting a component of an alarm system will trigger an alarm upon an unauthorized opening or attempted breach of a lock device. The only authorized opening of the lock device is either through actuation of a programmed keypad or, selectively, by means of a key which will preclude the triggering of the alarm system. Consequently, when the lock device is opened in a specified manner, such as by the owner of the firearm constrained in the rifle rack, the alarm will not be triggered.

Young U.S. Pat. No. 3,731,818 discloses a storage for a plurality of handguns, in which the latter are secured within a box-like safe or strongbox. However, there is no disclosure of an alarm system which will trigger so as to generate a signal indicative of access to the contents of the safe.

Gurvis U.S. Pat. No. 4,236,148 discloses a theft deterring and signal device for a portable fire extinguisher, wherein the unauthorized removal of the fire extinguisher from a particular location will cause an alarm signal to be triggered.

Other references disclosing containers or storage locations which incorporate alarm signals to protect the contents of a receptacle or valuables at various exposed locations include Field, et al. U.S. Pat. No. 4,663,621; Stelter U.S. Pat. No. 2,797,403 and Rauchut, et al. U.S. Pat. No. 4,268,823.

A considerable need has arisen to ensure that, even in particular instances when the repositories are accessed in a lawful and intentional manner and the firearm removed therefrom, indication of this action should be imparted to suitable law enforcement agencies, such as the local police department or other security services. Moreover, some information should be supplied to the appropriate law enforcement agency as to whether the access to the weapon or firearm in response to the opening of the repository was carried out under duress or in an emergency condition to signal an unlawful situation requiring police action, or as to whether the access to the firearm was intended to be in a normal manner by the owner thereof.

SUMMARY OF THE INVENTION

Accordingly, in order to meet the demands of the public in the provision of a system for the secure containment of a firearm, preferably in a repository, especially when such a firearm may become easily accessible to the owner, and possibly to others than the owner thereof, the present invention contemplates a repository for the containment of a firearm such as a handgun or the like, comprising a housing which receives at least a portion of at least one firearm therein. The repository may be an enclosed container structure having an operable drawer for storing one or more firearms of that type; or in the case of storage for longbarreled firearms such as rifles or shotguns, a locking device operating in conjunction with a rifle rack for securely preventing access to and removal of the firearm by any one other than the lawful owner of the firearm. In this connection, the firearm security system, besides the repository, incorporates a lock release which includes a selectively actuatable keypad-operated electric lock release mechanism and key-operated mechanical lock release mechanism.

In the event of actuation of the electrical lock release, which incorporates a programmable keypad containing either a numerical or alphabetically programmed code, the opening of the repository containing the firearm generates a signal through an alarm system at a location which is remote from the repository, such as at a police station, security service or similar law enforcement agency, that access to the contents of the repository, in effect, possible removal of the firearm contained therein, has been carried out under a certain condition; for example, intentionally by the owner, or under duress or emergency state in which the owner of the firearm is subjected to or expects an unlawful or criminal entry to the locale of the firearm repository.

Alternatively, the repository may be selectively opened by the mechanical release mechanism through manual operation with a key, which will simultaneously deactivate the electrical lock release mechanism, and again generate an alarm signal at the appropriate location of the law enforcement agency as to which kind of access has been made to the firearm in the repository, in all likelihood by the owner of the weapon. In this connection, the firearm security system includes an electrical alarm circuit which is connected with the repository locking device, and in which the release of the latter, through the selective actuation of the electrical or mechanical lock release mechanism, generates a signal at the remote location of the law enforcement agency, while the alarm is silent at the location of the repository, as to which particular lock release has been actuated, thereby imparting information as to whether the access to the firearm was intentional by the owner or effected under duress and in an emergency condition.

In view of the foregoing, it is an object of the present invention to a provide a security system for firearms or the like which will provide immediate information at a remote location of access having been made to firearm stored in a repository.

A further object of the present invention is to provide a firearm security system incorporating an alarm system generating a signal at a remote location indicative as to whether the firearm in the repository has been accessed and/or removed either in an intended manner or under emergency and/or duress conditions.

A more specific object of the present invention resides in the provision of a firearm security system of the type described herein, in which the repository, which may be either a closed container structure for storing a handgun or a locking device for restraining rifles and shotguns in a rifle rack, includes a selectively-actuated lock releases of electrical and mechanical types, in which the activation of a specific one of the lock releases will provide information as to whether access to the firearm contained in the repository was effectuated in an intentional or emergency mode.

The invention also relates to a security system for the containment of at least one firearm in a repository, comprising a repository having a housing which defines an internal space which receives at least a portion of at least one firearm therein; locking means for securing the firearm in the repository; and means for releasing the locking means to unlock the repository and facilitate access to the firearm contained therein. The releasing means includes an electrical lock release means for selectively actuating the electric lock release and alarm means responsive to selective activations of electrical lock release. The alarm means includes means for generating a first alarm signal indicative of an emergency condition in response to a first selective actuation of the electrical lock release; means for generating a second alarm signal indicative of a non-emergency condition in response to a second actuation of the electrical lock release and means for bypassing the alarm means in response to a third selective actuation of the electrical lock release.

In this system, the means for selectively actuating the releasing means comprises a manually-operable programmable key pad, the means for transmitting the first and second alarm signals at a remote location includes a telephone line, and the means for generating the first, second and third alarm signals each comprise a code which is entered with the keypad. The releasing means preferably comprises a separately actuatable mechanical lock operatively associated with the electrical lock release for accessing the firearm.

4. The mechanical lock preferably comprises a latch mechanism, and a key member, and may be engaged with the key member without actuating the electrical lock and without generating any alarm signals. Also, the alarm means may include audio alarm means connected to the firearm repository for triggering the emitting of an audio or visual alarm at a location remote from the repository responsive to the first selective actuation of the electrical lock release.

Advantageously, the firearm repository comprises a closed box-shaped container structure and a drawer for the firearm in the container structure, where the mechanical lock latches the drawer in the container structure in the closed position of the repository. Thus, the electrical lock release is capable of disengaging the latching engagement of the drawer from the container structure to allow withdrawal of the drawer therefrom in response to the selective actuation of the electrical lock release to facilitate access to the contents of the repository.

When the, latching arrangement encompasses at least the trigger-actuating portions of the firearms to inhibit access thereto when said firearms are locked in said rack structure. Also, the rack structure may include a bullet-proof end portion for housing the muzzle ends of the firearms.

In the firearm security system of the invention, the remote location may be a police station or security service locale and the alarm signal is indicative of an emergency condition requiring access to the firearm. To provide continuous monitoring, the repository preferably includes means for generating an alarm signal in the event of a power loss or an attempt at removal of the repository.

Another embodiment of the invnetion relates to a repository having a housing which defines an internal space which receives at least a portion of at least one firearm therein; a firearm received in the repository; means for sending a first alarm signal automatically upon removal of the firearm from the repository; and means for transmitting a second alarm signal independent of the removal of the firearm from the repository.

In this system, the repository includes a recess for receiving the firearm and switch means for sending the first alarm signal. Preferably, the repository recess includes a switch means which engages upon removal of the firearm to automatically send the first alarm signal. In addition, the repository may include a switch which can be depressed for transmitting the second signal.

In one arrangement, the repository comprises a holster and the means for sending the first alarm signal comprises a switch operatively associated with the firearm for engagement upon withdrawal of the firearm from the holster.

Also, the switch for sending the second alarm may be mounted upon a bracelet.

A further object of the present invention is the provision of a mechanical push button lock which may be used with these security systems. This lock may be released by the entry of one of three different codes. Two of the three access codes unlock the locking mechanism to permit access and causes either one of two parts to protrude from the lock housing as an actuating contact. When protruded, the contact can be used to actuate a device, such as an electronic alarm system or other possible security arrangement. The third combination allows access but performs no other function. Codes can be easily changed by the user as desired.

In particular, a multiple access code permutation combination lock that provides for push-buttons which selectively operate on groups of gears within a housing and, in which part(s) of the lock mechanism protrudes from the inner lock to function as an actuating contact(s) upon the application of two of the three possible access code arrangements is preferred. The combination lock mechanism together with a control knob is connected to a latch mechanism and provides for manual opening of the lock. A control is also provided for easy changing of the combination locking code(s). Thus, a functionally improved permutation push-button combination lock is provided which serve as a controlled access actuator in addition to its inherent locking function.

BRIEF DESCRIPTION OF THE DRAWINGS

Reference may now be had to the following detailed description of exemplary embodiments of the invention, taken in conjunction with the accompanying drawings in which:

FIGS. 8–13 illustrate a preferred mechanical locking mechanism for use with the security system of the invention; in which:

FIG. 8 is a top view of the locking mechanism;

FIG. 9 is a side view, in cross-section, of the locking mechanism of FIG. 8;

FIG. 10 is a top view of the inside of the locking mechanism of FIG. 8;

FIGS. 11 and 11A are top and side views of the bottom portion of the locking mechanism of FIG. 8;

FIG. 12 is a detail illustration of the ball bearing gears of the locking mechanism of FIG. 8;

FIG. 13 is a detail of a side mounting plate for the gears shown in FIG. 12.

DETAILED DESCRIPTION OF THE INVENTION

Figure 1:
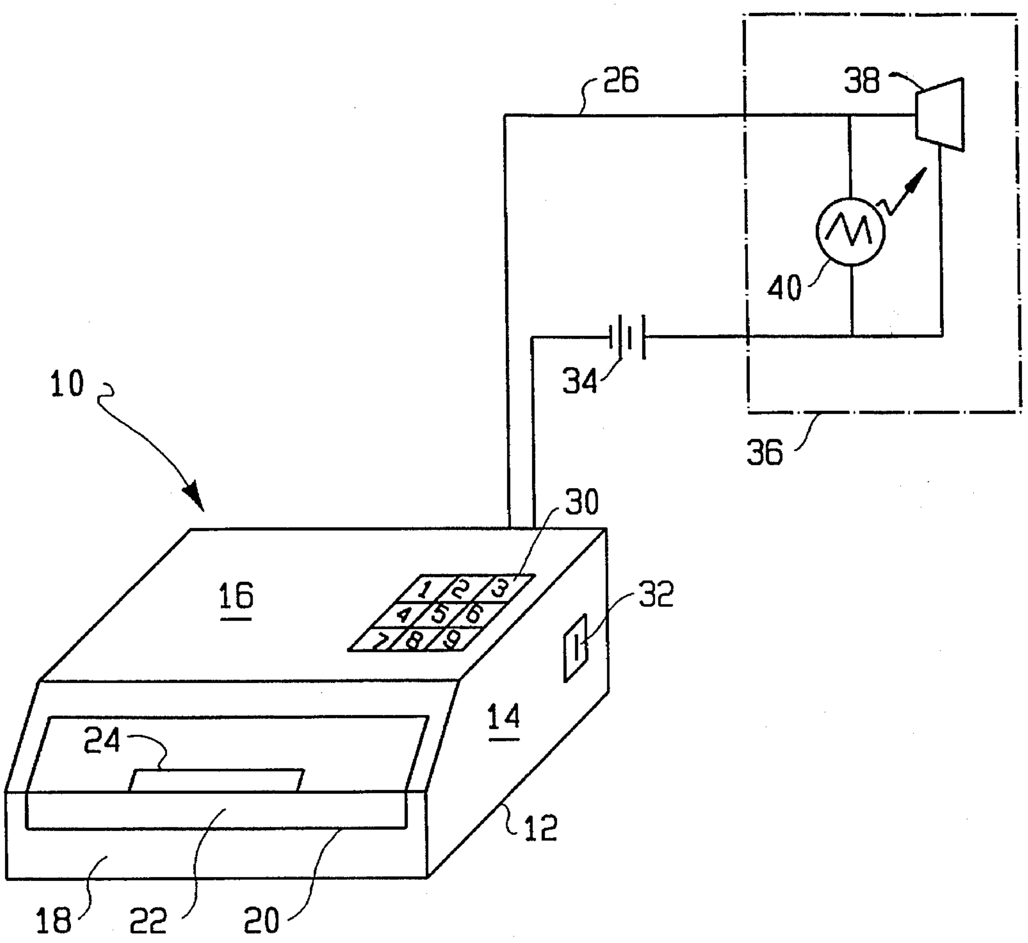
FIG. 1 illustrates a generally diagrammatic perspective view of a first embodiment of a firearm security and alarm system illustrating a repository for the firearm in the closed condition thereof.
Figure 2:
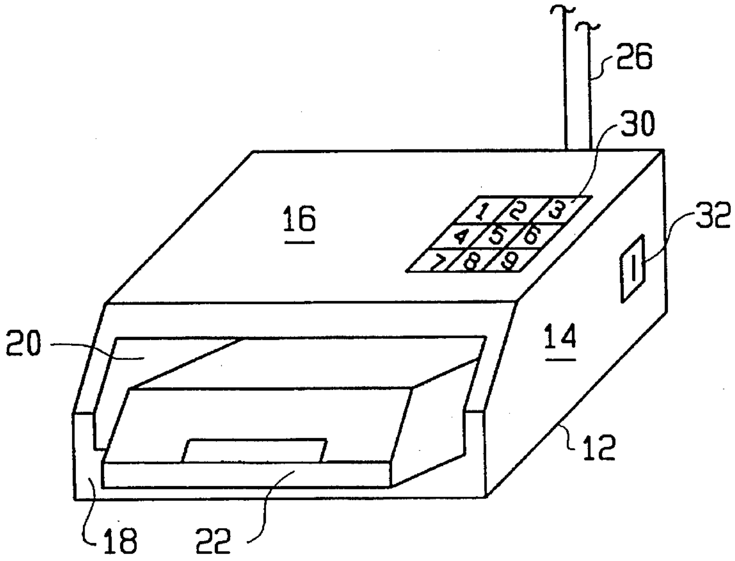
FIG. 2 illustrates a view similar to FIG. 1 showing the repository in an opened condition providing for access to a firearm contained therein.

Referring now in detail to the drawings, and particularly the embodiment of the invention as illustrated in FIGS. 1 and 2, there is disclosed a firearm security system 10 which incorporates a repository 12 for a firearm, such as a loaded handgun (not shown). In this embodiment, the repository 12 essentially consists of a box-like container structure, preferably of steel or the like, possessing a generally rectangular configuration having upstanding sidewalls 14, a rear wall, a top wall 16, a front wall 18 with a sloping portion with an opening 20 therein adapted to receive a drawer 22 structure 12 which is insertable and with drawable through the opening 20, and which drawer includes a handgrip or recessed wall portion 24 enabling the drawer 22 to be pulled outwardly of the repository 12 when the latter is in an unlocked condition, for either inserting a firearm into the drawer 22 or removing a firearm therefrom.

The firearm security system 10 includes an electrical alarm circuit 26 which is wired to the repository 12 in a manner well-known in the burglar and security alarm technology. The alarm is operatively connected with a repository lock release arrangement, which maintains the drawer 22 in a locked condition when the latter is inserted into the repository 12, and wherein the lock release arrangement includes an electrical lock release 30 which may include either a numerical or alphabetical manually-operated keypad having a predetermined lock releasing sequence programmed therein, the keypad possibly including luminescent material to enable viewing and operation thereof in the dark, and mechanical lock release 32 which is adapted to be operated through the intermediary of a key insertable therein in selective actuation with the electrical lock release 30.

The security alarm circuitry 26 which is connected to the repository 12 incorporates a source of electrical power (not shown), and in addition thereto, a battery 34 so as to enable functioning of the alarm system in the event of a power outage for a predetermined period of time. The alarm system 26 communicates with a remote location 36, which may be a police station, a security service or other law enforcement agency such that, in the event a signal is generated in response to the opening or unlocking of the repository 12, emit an audio alarm signal at 38 and/or a light signal at 40 at that location 36.

A firearm, such as a loaded handgun, is positioned in the drawer 22, and the latter is inserted into the repository 12 so as to cause automatic locking of the drawer in the repository. When it is desired to remove the firearm from the repository 12, a suitable numerical or alphabet sequence may be imparted to the keypad 30. This sequence upon being introduced into the keypad, when it corresponds to a sequence programmed or encoded therein, will cause the locking mechanism to release the drawer 22, thereby allowing the drawer to be pulled out of the container through opening 20 by engaging the gripping recess 24, and permitting for removal of the firearm stored therein. Simultaneously with this actuation of the electrical lock release 30, the mechanical lock release 32 will be deactivated, and the opening of the drawer 22 will cause the alarm circuit 26 to generate a signal at the remote location 36; however, without any visual or audio signal being in evidence at the location of the repository 12, in effect, causing the triggering of a so-called "silent alarm", and producing an audio and/or visual signal at, respectively, locations 38 and 40, signaling that access to and possible removal of the firearm from the drawer 22 has been implemented. When the correct code is entered into the keypad 30, the signal provides an indication that the opening of the repository 11 has been effectuated through actuation of the electrical lock release 30, and that the access is being made by an authorized person.

If an incorrect code is entered, such as the reverse digits of the correct code, remote location 36 is notified, again by a silent alarm, that the opening the repository is being made under an emergency condition by the owner under duress. The remote location then notifies the appropriate law enforcement personnel to investigate the matter.

Alternatively, the closed repository 12 containing the firearm may be opened by inputting yet another code into the keypad 30, which code does not trigger or send any alarm to the remote location. Thereafter, access to the firearm may be made by inserting and operating a key in the mechanical lock release 32. In the event of a power failure, it will also be possible to obtain access to the cabinet by inserting the key into the mechanical lock release 32, which simultaneously deactivates the electrical lock release 30.

Although the container-like repository 12 is shown as being in a horizontal position, it can be mounted on a wall or floor as to be fastened thereto in any suitable orientation. Moreover, the repository 12 and drawer can be either constructed of a steel alloy or similar high-strength material, and may also contain bullet-proof wall surfaces of materials such as Kevlar, which should cause any accidental discharge of the firearm to render the projectile harmless.

Figure 7:
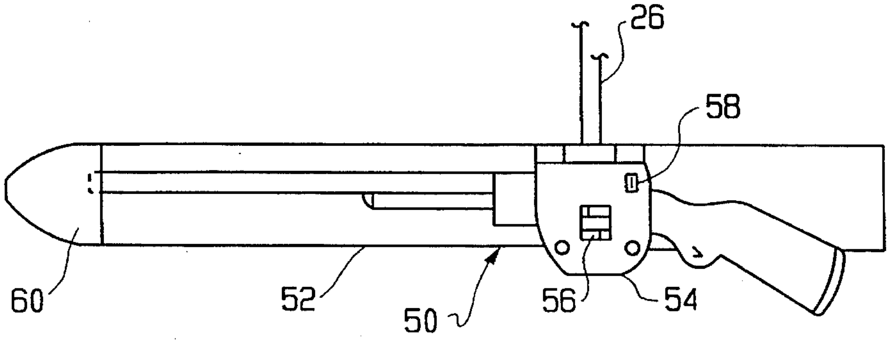
FIG. 7 illustrates a second embodiment in the form of a rifle rack having a rifle or shotgun supported thereon and incorporating a firearm security and alarm system pursuant to the invention.
Figure 8:
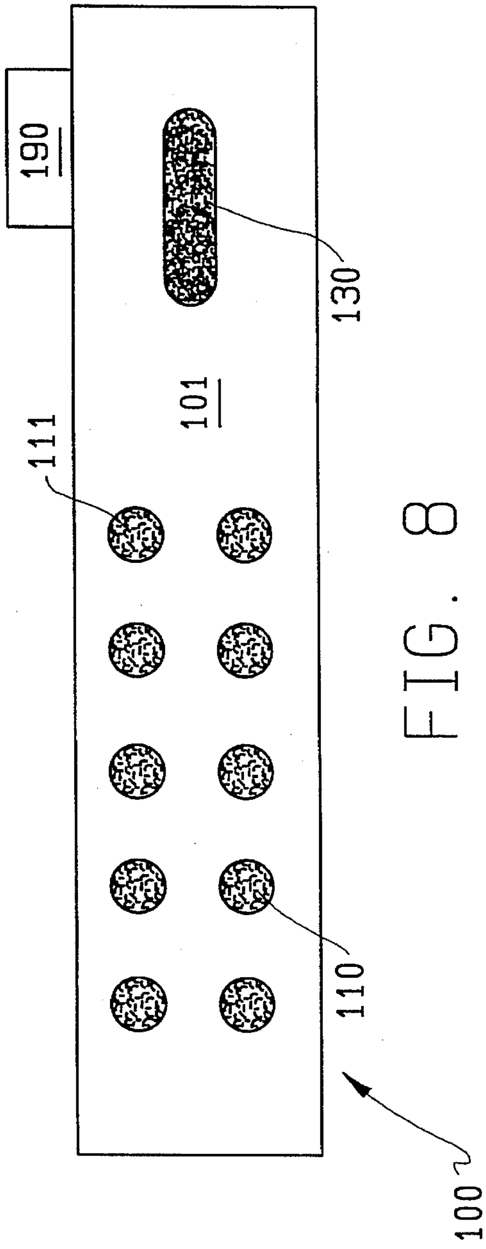
Figure 10:
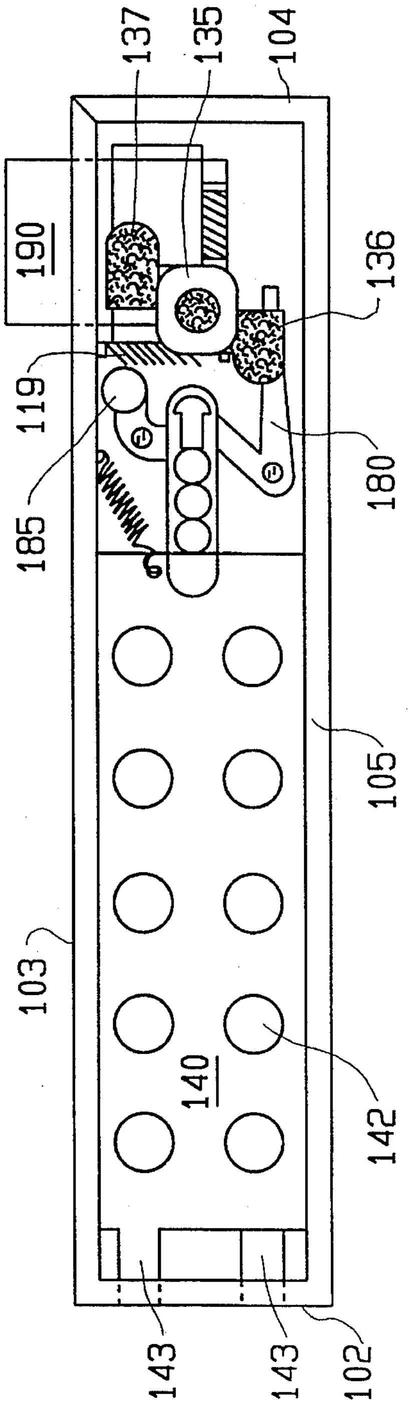
Figure 9:
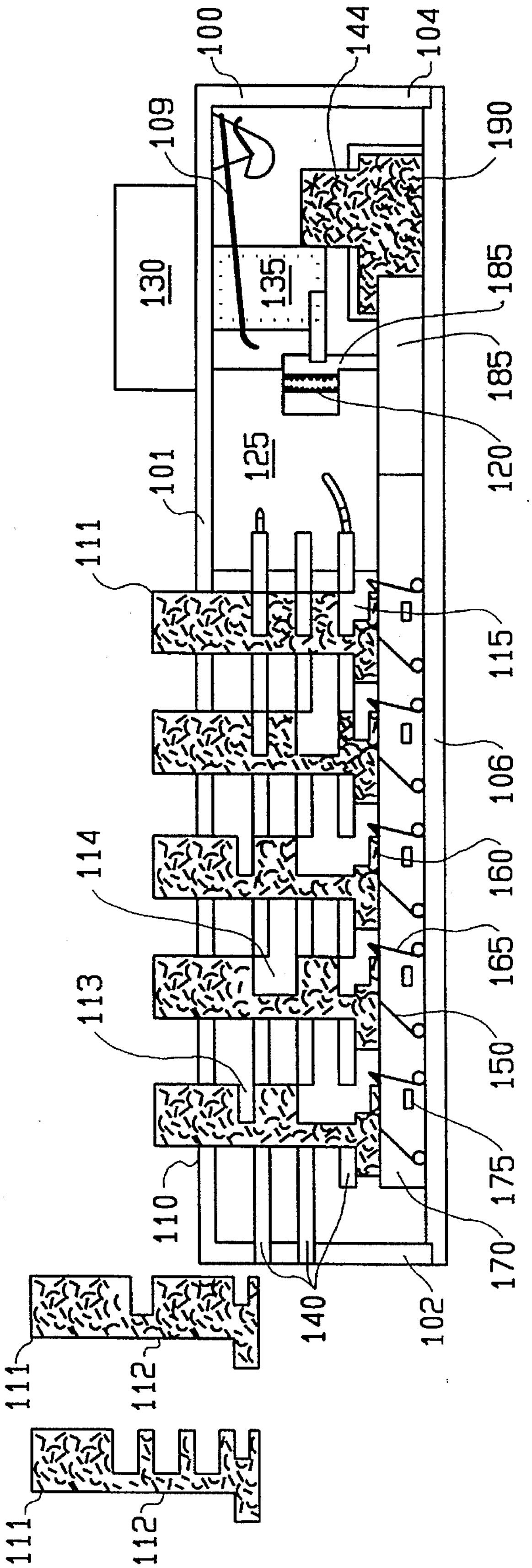
Figure 11:
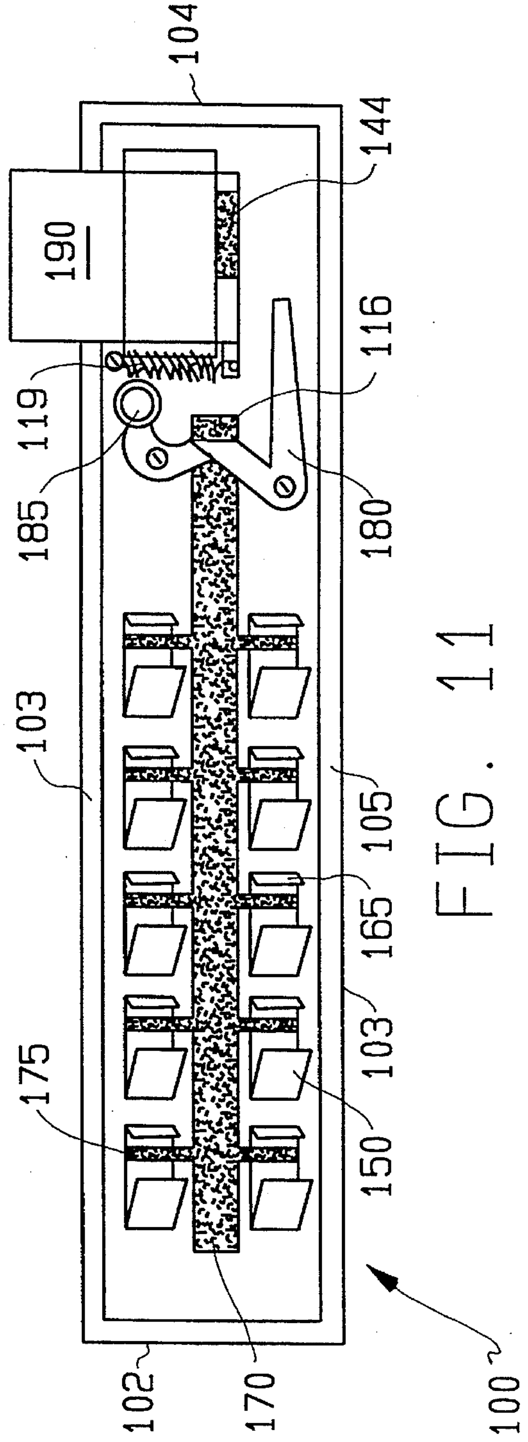
Figure 11A:
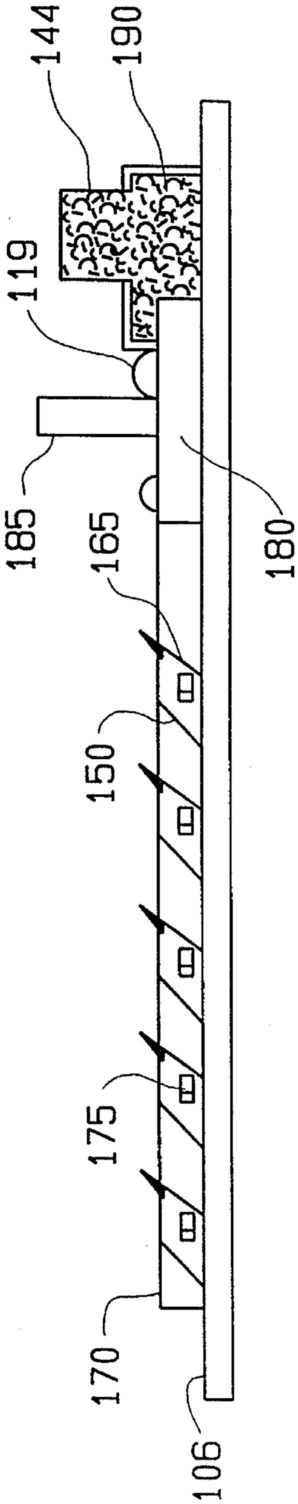

In other embodiments, the repository may be any structure or device which receives all or at least a portion of the firearm. Closed containers of all types which are capable of receiving the firearm itself, or a portion of the firearm, such as the handle, barrel and/or the trigger portion, can be used. It is advantageous for at least the trigger portion to be surrounded by the repository so that the firearm cannot be accidently discharged while secured in the repository. As shown in FIG. 7, the repository may surround and enclose the trigger portion of one or more rifles. An alternative of the drawer structure is shown below in the description of the patrol bracelet embodiment. An alternative of the trigger portion engaging repository is also shown below in the description of the holster embodiment.

The keypad can be directly linked to a transmitter which operates the telephone to contact the remote location, or it can be part of a so-called "panic switch". A typical wireless panic switch includes a base unit having outputs for normally open and normally closed loops, and can send an alarm signal to either type of loop after receiving an appropriate signal from the wireless unit. The wireless unit is used to trigger the base unit. Once a signal is sent to the base unit immediately processes the information and takes the appropriate action, such as dialing the remote location when the reverse code is received. Pressing just one button will produce a test signal, which will light an LED at the base unit but not trigger a full alarm. The radio link operates on a frequency of approximately 382 Mhz; maximum range is approximately 200 feet outdoors and 60–100 feet indoors.

To prevent interference from other sources of RF energy near 382 Mhz, when a wireless pad is used, the present invention contemplates switches to enter an eight-bit security code for both the base and wireless units. This code will be sent by the wireless unit, and the base unit will not respond to any signal that does not contain this code. The recognition of the code can be as described above.

Figure 3A:
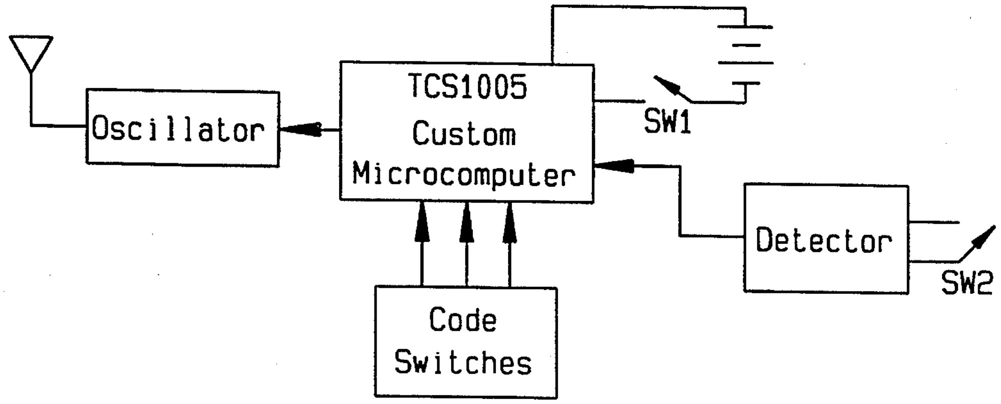
FIGS. 3A–3B are a diagram of the base and remote units of the wireless switch of the invention.
Figure 3B:
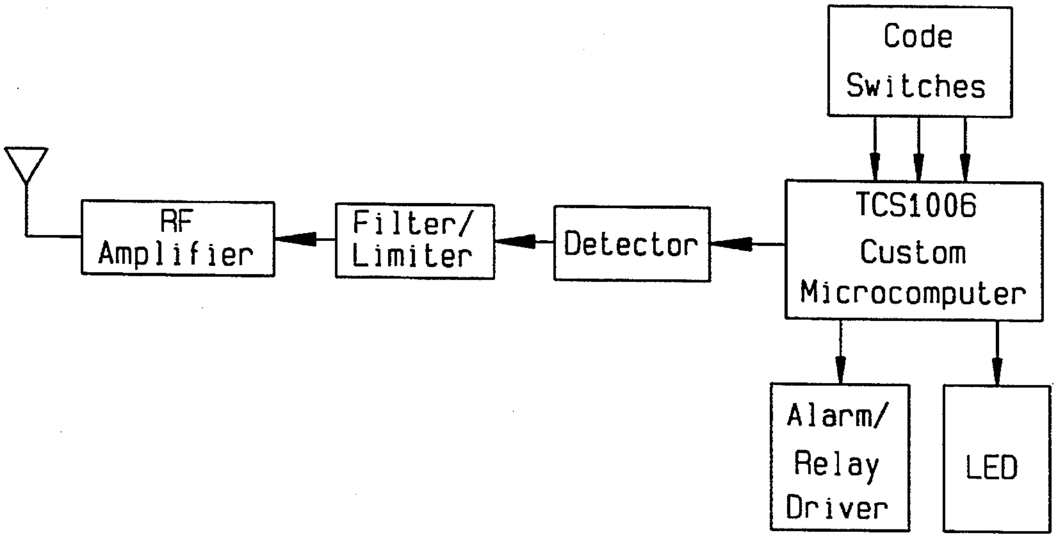

The heart of both the base and wireless units is a custom single-chip microcomputer. The wireless unit uses a TCS1005 and the base unit uses a TCS1006. In addition to the arithmetic and logic circuitry, both devices include internal RAM and ROM as well as a clock generation circuit. There are also input and output ports on both devices. FIG. 3 shows block diagrams for both the wireless and base unit. In both cases, the security code is determined by mechanical switches connected to the single-chip microcomputer. The TCS1005 supplies an output signal to modulate the oscillator stage, which consists of a single transistor. The output frequency is determined by tuned networks of capacitors and inductors; the inductors are microstrips formed other circuit board itself. Two switches, labeled SW1 and SW2, are connected to the TCS1005. Switch SW1 is, operated by entry of the code in the correct sequence, causes a signal to be sent to the base unit, which lights a LED and informs the remote location that the repository is being accessed by an authorized user. Thus, it does not trigger an alarm. Note that SW1 closes the battery power supply circuit and that SW1 must be closed to activate the wireless unit. If the code, is entered in reverse, SW2 closes to activate a panic detector stage, which uses a single transistor. This stage sends a signal to the TCS1005. When both SW1 and SW2 are closed, the wireless unit will radiate a signal. The TCS1005 will add a security code to this signal depending upon the setting of the switches connected to it.

Several layouts for simple electronic locking systems are provided herein. In each case, it should be understood that the components are selected to suit the conditions of an actual situation. In all of the layouts, the system voltage values have been omitted, as they can vary. In nearly all cases the systems will be 12 or 24 volts.

Figure 4A:
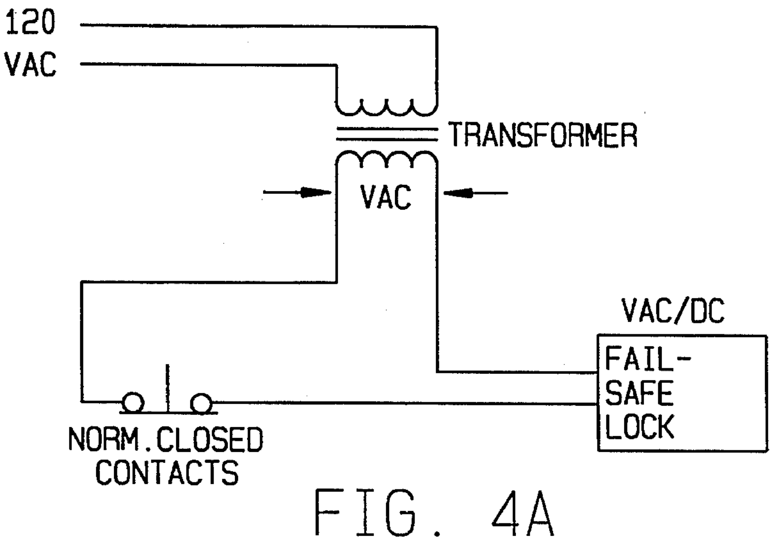
FIGS. 4A–4F illustrate various AC and DC electronic locking circuits for use in the present invention.
Figure 4B:
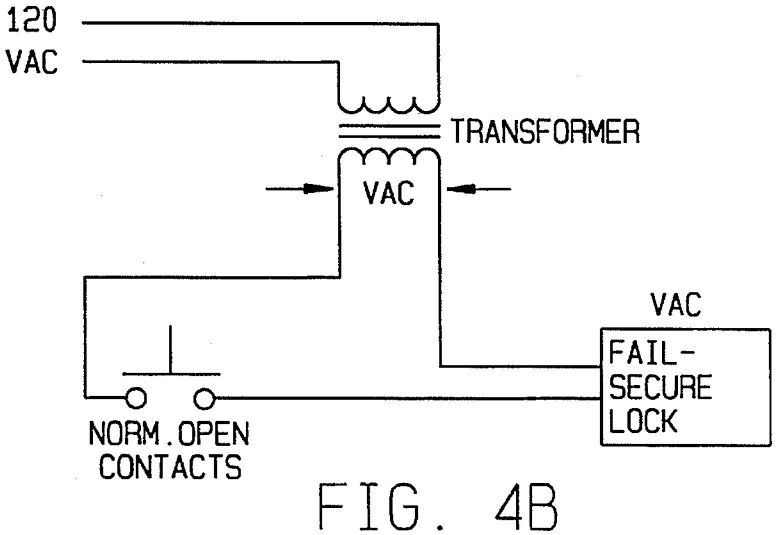
Figure 4C:
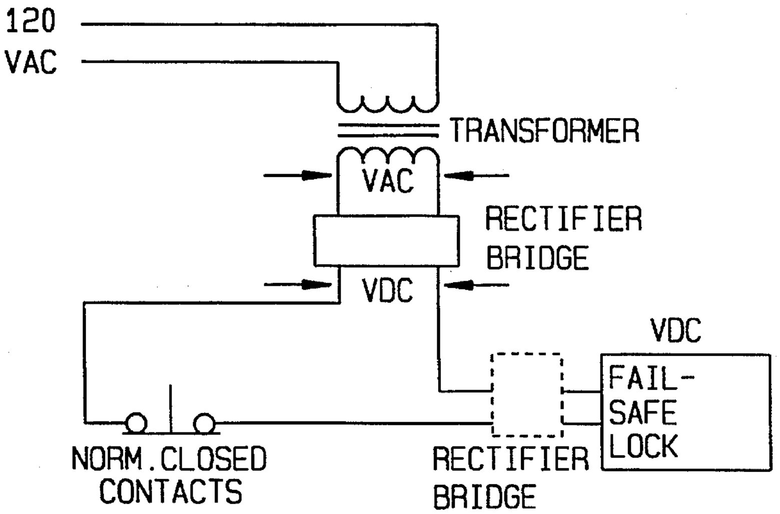
Figure 4D:
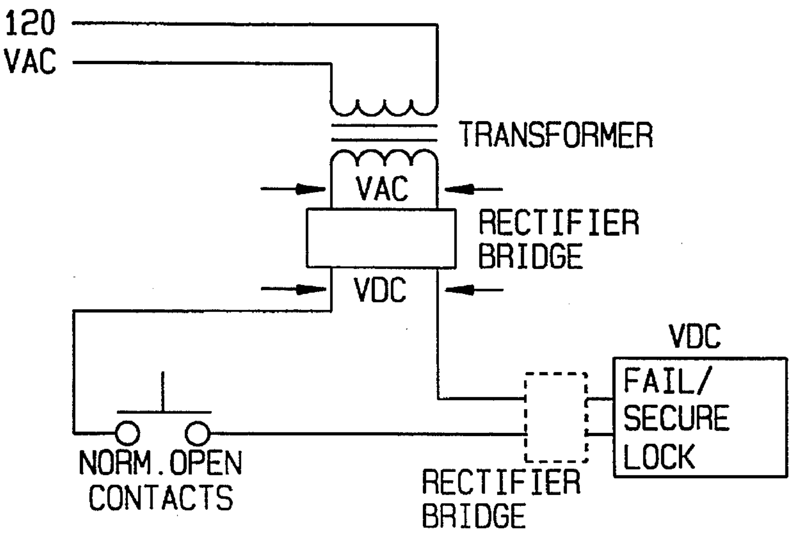
Figure 4E:
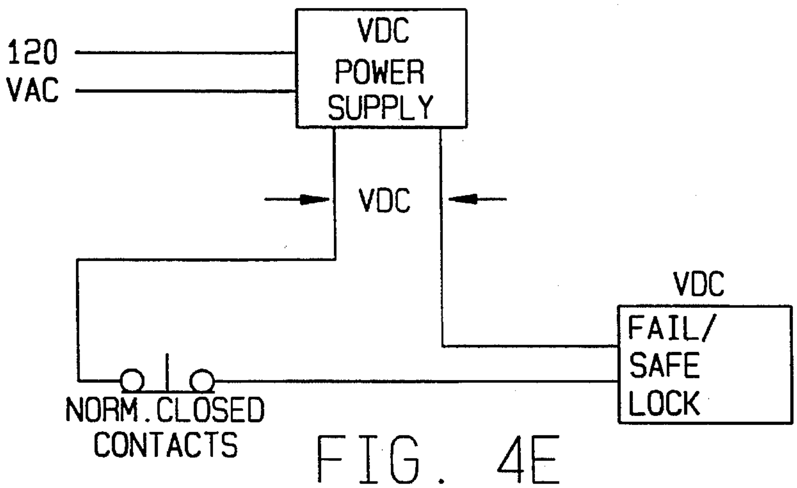
Figure 4F:
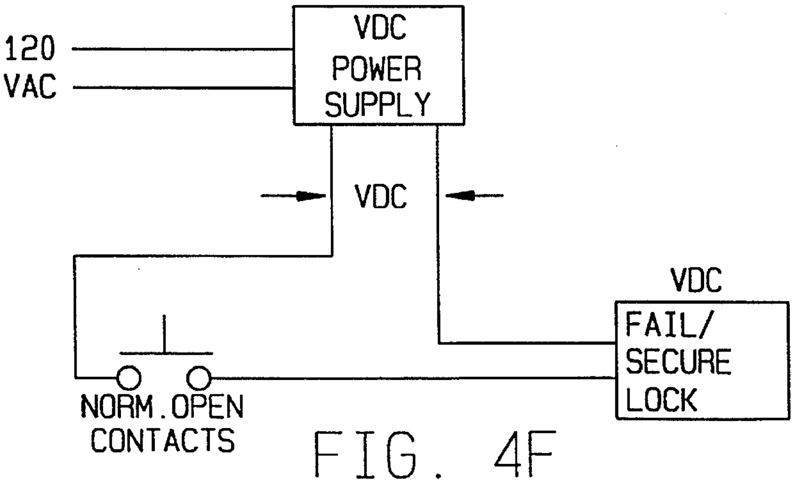

FIGS. 4A–4F illustrate the use of the transformer, rectifier, and DC power supply. As shown in FIGS. 4A and 4B, a lock rated for AC operation needs only a transformer as a power source. FIGS. 4C and 4D show a DC lock, which needs the addition of a rectifier to change AC to DC before power enters the lock. The rectifier can be located at the transformer or at the lock. An alternative method for powering DC locks is to provide a DC power supply, as shown in FIGS. 4E and 4F. Other diagrams provided in this section will show circuits for other specific types of locks.

Figure 5A:
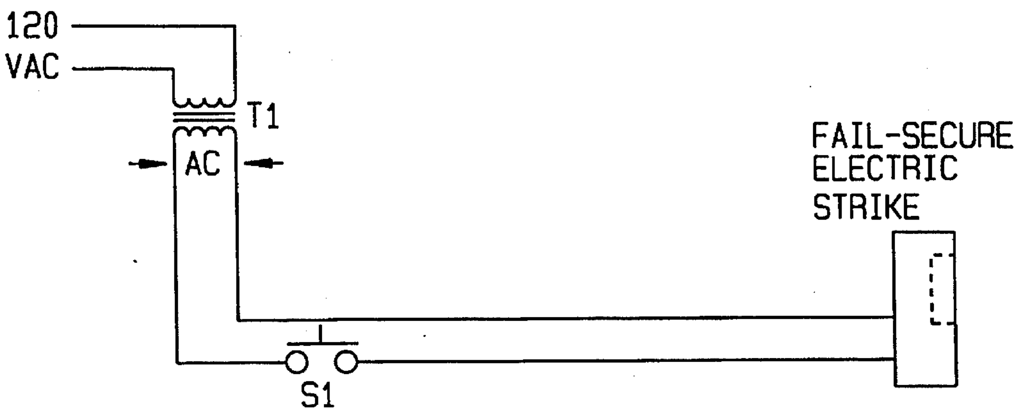
FIGS. 5A–5C show various electric strike systems for use in the invention.

The three diagrams in FIG. 5 show simple electric strike circuits. As shown in FIG. 5A, the transformer (T1) supplies AC to the strike when the normally open switch (S1) is closed. The strike releases with a buzzing sound, which acts as an "open" signal.

Figure 5B:
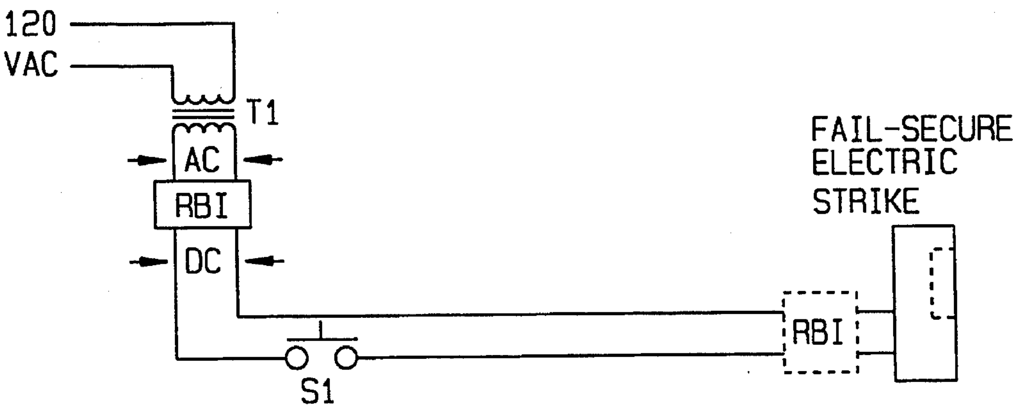

In FIG. 5B, the transformer (T1) supplies AC to the rectifier (RB1), which converts it to DC. When the normally open switch (S1) is closed, the DC power releases strike silently. The rectifier may be wired to T1 secondary or to strike leads, as shown.

Figure 5C:
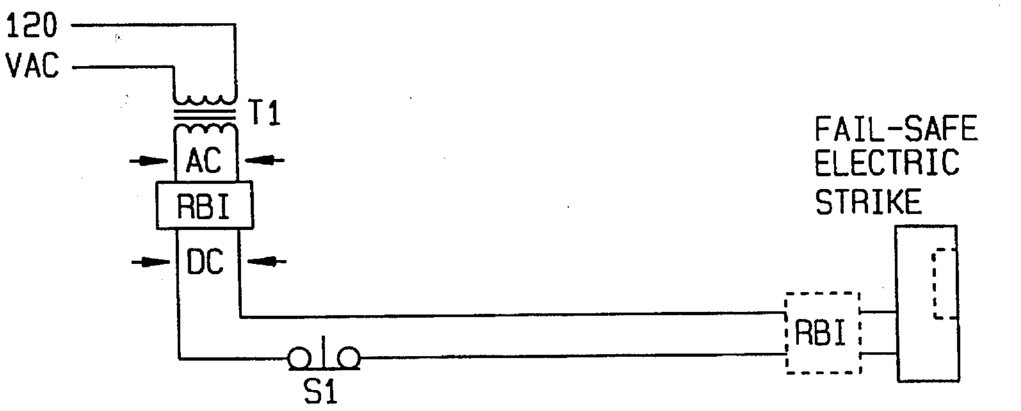

In FIG. 5C, the fail-safe operation requires that DC be continuously supplied to the strike through the normally closed switch (S1). If the rectifier (RB1) were not used, the strike would buzz constantly during the locked cycle. Opening the switch contact releases the strike by interrupting power.

Figure 6A:
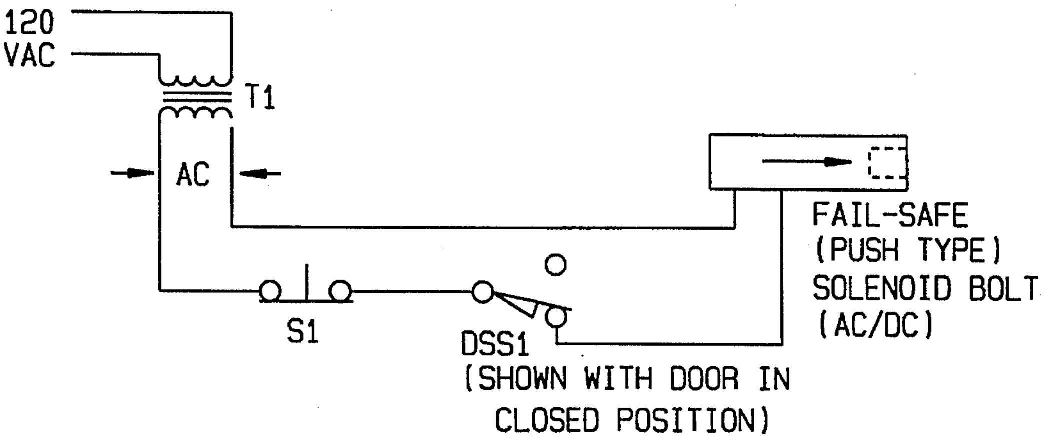
FIGS. 6A–6B illustrate diagrams for fail-safe and fail-secure solenoid operated belts.

FIG. 6 shows diagrams for fail-safe and fail-secure solenoid-operated bolts. In FIG. 6A, the fail-safe operation requires that all switches be closed before the transformer (T1) supplies power to energize the solenoid and project the bolt. A door status switch (DSS1) is used to ensure that power will not flow to the solenoid unless the door is closed. This switch keeps the bolt from projecting while the door is open; it is sometimes called the automatic relock switch. Note that closed switches are wired in series.

Figure 6B:
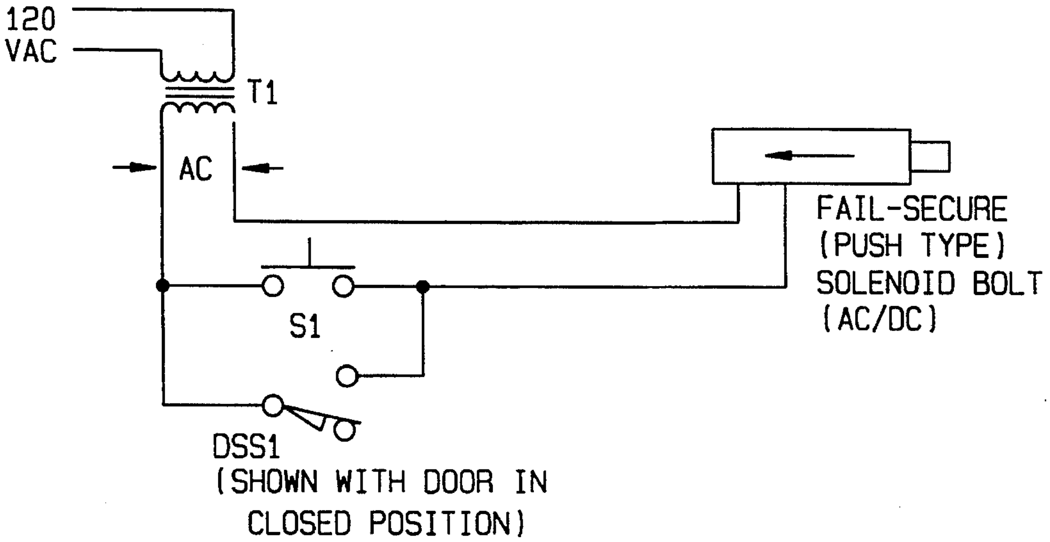

In FIG. 6B, the fail-secure bolt is normally projected without power. The closing switch (S1) allows the transformer (T1) to supply power to the solenoid, retracting the bolt. When the door is opened, the door status switch (DSS1) closes, keeping power on the solenoid, even if the control switch (S1) is reopened. This switch ensures that the bolt will not project while the door is open. Note that open switches are wired in parallel.

Many solenoid-operated bolts are available with built-in rectifiers and many are operated from AC or DC. If a rectifier is required separately, it may be wired as shown in FIG. 5.

In the embodiment of FIG. 7 of the drawings, the electrical system 26 is substantially identical to that of FIG. 1, and need not be further described in detail hereinbelow. In this particular embodiment, rather than a container-shaped repository 12, the firearm security system 50 encompasses a rifle rack 52, having a rifle mounted thereon in a manner which is well-known in the art, such as by supporting hooks or the like, and in which a hinged locking device 54 as a component of the rifle rack 52, while covering the trigger mechanism of the rifle or shotgun which is suspended from the rifle rack 52, and latches to the back wall surface 55 of the rifle rack so as to constitute a locking and protective structure which will restrain the firearm within the rifle rack while concurrently preventing access to the trigger mechanism of the former.

The locking device 54, in a manner similar to the embodiment shown in FIGS. 1 and 2, includes a keypad 56 which may be either alphabetical or numerically programmed, and also includes a mechanical key-operated lock release 58, both of which are connected to the alarm circuit 26 in the same manner as in the preceding embodiment.

Thus, when it is desired to remove the firearm, in effect, the rifle or shotgun, from the rifle rack 50, it is merely necessary to actuate the electrical lock release 56 or selectively the mechanical lock release 58 in a manner analogous to and with a result analogous with that described with regards to the previous embodiment and the unlocking of repository 12, thereby triggering an alarm signal at remote location 36 indicating that access has been made to the firearm in accordance with a predetermined condition depending upon which lock release 56 or 58 has been selectively actuated.

Furthermore, the end portion 60 of the rifle rack 50 which is adapted to receive the muzzle portion of the rifle or shotgun barrel may be of a cone or pocket-shaped configuration, consisting of an essentially bullet-proof material such as Kevlar, so as to render any projectile harmless upon an inadvertent discharge of the firearm.

From the foregoing, it becomes readily apparent that the inventive firearm securing system 10 or 50 clearly meets a current need for providing a secure containment for firearms, while concurrently providing rapid and accurate information through the intermediary of the alarm system 26 as to any opening of the repository 12 or rack 52 for the firearm, and the manner in which access has been made; in essence, either unauthorized or intended depending upon the particular lock release mechanism which has been actuated.

FIGS. 8–13 illustrate a mechanical pushbutton lock 100 which may be used either alone or in combination with the electronic security system of the invention. This lock is accessible only by entry of one of three possible codes. Two of the three codes cause one of two parts of the inner lock to protrude and serve as an actuating contact to whatever either engage the electrical security system or to operate other devices in conjunction with this lock.

Lock 100 has a housing made of two parts. The top part includes face plate 101 and four sidewalls 102, 103, 104, 105. The bottom part includes a base plate 106 upon which are mounted various operating components which will be described hereinafter. Face plate 101 includes a plurality of apertures in which are placed a series of numerically or alphabetically identifiable buttons 111 for engaging control mechanisms within the housing. The buttons 111 in the form shown allow their extended ends to be directly engaged by the finger of an operator.

The stems 112 of buttons 105 pass through the face plate 101 and the control mechanisms within the casing. The stems 112 of the buttons 111 are slotted 113, 114, 115 at specific points for reasons which will be apparent later. A total of 10 buttons are shown of which there can be a number of different types. The type of button is determined by the specific locations where slots 112 are cut on the stem. The different types of buttons enable different combinations to be made for opening the lock by depressing certain selected buttons. The slots 113, 114, 115 are placed in relatively upper, intermediate and lower positions on stems 112. Also, these slots can have various widths, or can be omitted as necessary to obtain the desired combinations.

A control mechanism is formed by two mechanisms that are assembled together to function as a locking device and actuator. A first mechanism includes three movable plates 140 which include apertures 142 that allow the stems of the buttons to pass through. These openings 142 are identical in proportion to the openings 110 in face plate 101. These plates 140 are assembled into grooved tracks on the inner walls 101, 103 of the top housing. Within these grooved tracks, the plates slide independently upon the operator's opening of the lock. The plates 140 are held in position between the stems of the buttons and the second control mechanism 125 when the lock is in the locked position.

Upon the entry of one of the three possible access codes by depressing selected buttons 111, one of the three plates would be permitted to slide into the designated slots 113, 114, 115 on the stems of the buttons. As noted above, the slots have different widths so that they can either allow the plates to pass when its respective button is not depressed and/or allow the plates to pass when depressed. Thus, by depressing the correct series of selected buttons, all three plates can slide to allow opening of the lock.

A selective actuator 125 causes the designated plate or plates 140 to slide when the correct code is manually entered on the buttons and the control knob 130 is turned 180 degrees clock-wise. Control knob 130 is biased by spring 109 for ease in operation. Turning the control knob 130 causes the control shaft 135 to turn and its contact flange 136 to meet with a sliding bolt 120 inside of the selective actuator 125. When rotated to the fully opened position the contact flange 136 of the control shaft 135 causes the bolt 120 to linearly actuate specific elements of a series of ball-bearing like gears 138. When actuated, the gears will be forced into a specific order that is determined when one of the three plates is allowed to slide upon the entry of one of three possible access codes. Entering the proper code upon the buttons aligns specific designated slots 113, 114, 115 on the buttons with the required plate or plates 140 allowing them to slide into the slots of the pressed buttons.

Thus, at the instant the flange 136 on the control shaft 135 makes contact with the sliding bolt 120, an identical flange 137 on the opposite side of the control shaft makes contact with a flange contact 144 at the base of a knob 190. This knob 190 is held in a locked position by the tension exerted on it from spring 119. The spring 119 is sufficiently rugged to prevent the lock from opening due to a sudden jolt or due to vibration. Further rotation of the control knob 130 causes simultaneous actuation of the sliding bolt 120 and retraction of the bolt 145, thus ultimately opening the lock.

Further rotation of the control knob 130 causes the flanges 136, 137 on the control shaft 135 to make contact with and simultaneously actuate two different but functionally analogous latch release contacts 180 and 185. One latch release actuator 180 is activated by the full retraction of bolt 145. The other 185 is activated when a flange 136 on the control shaft stem 135 rotates past sliding bolt 120 and further contacts with latch release actuator 185 causing it to swivel in a specific direction. Both latch release actuators simultaneously contact the latch release contact 116. Upon contact and with further actuation, the latch release actuators 180, 185 cause the latch release 170 and its latch release arms 175 to retract and pull all latches 155 from their button locking positions. This action allows the buttons, previously in a pressed and locked position to spring up, back into their unlocked position, by means of spring-latch 165 located beneath the buttons when the lock is assembled.

Spring-latch 165 is so-called because it is a single part, more specifically a single sheet of high-strength material manufactured in a unique configuration that permits the structure to function as a spring and a latch for the specific purpose for which it was designed. Upon full manual depression of a button, the button of its stem causes the spring part 150 of the spring-latch 165 to bend as designed allowing recession of the button to a specific depth within the lock. When the stem of the button has reached a specific depth within the lock, the latch part 155 of the spring-latch 165 latches on to a catch on the bottom of the stem of the button, thus locking the button in position until released by the latch release 170.

Two of the three plates have extending flanges 143 which when actuated in the process of unlocking the lock, protrude from the lock to act as an actuating contact. These contacts can be used to send the alarm signals as described above. Also, other uses for these contacts range in variety as much as in function by the way the lock is assembled and utilized.

Access is attained by pushing the correct numbered buttons 105, then turning knob 130 and rotary contact 135. Rotary contact 135 meets actuator contact 120 and bolt contact 144 simultaneously when turned clockwise. This action causes the actuator contact 120 to slide toward center of actuator 125 and push balls 138 into plates 140. The balls 138 will push one of the plates 140, depending upon the code that is used. While the rotary contact 135 is turning past actuator contact 120 it simultaneously presses against bolt contact 144 causing bolt 145 to retract, thus allowing lock 100 to open.

Button 105 is biased upwardly by a spring latch 150. When latch on button 105 is pushed into lock 100, spring latch 150 is suppressed while catch 160 on bottom of button 105 is engaged by latch part 155 of spring latch 150. Button 105 is locked into "pushed" position until latch release 170 with its latch release arms 175 pull spring latches 150 off of buttons 105 thereby allowing them to spring back up. The primary latch release activator 180 actuates latch release 170 when bolt 190 full retracts making contact with the primary release actuator 180 or when rotary contact 115 makes contact with secondary latch release actuator 185 actuating latch release 170, causing buttons to spring up.

Figure 12:
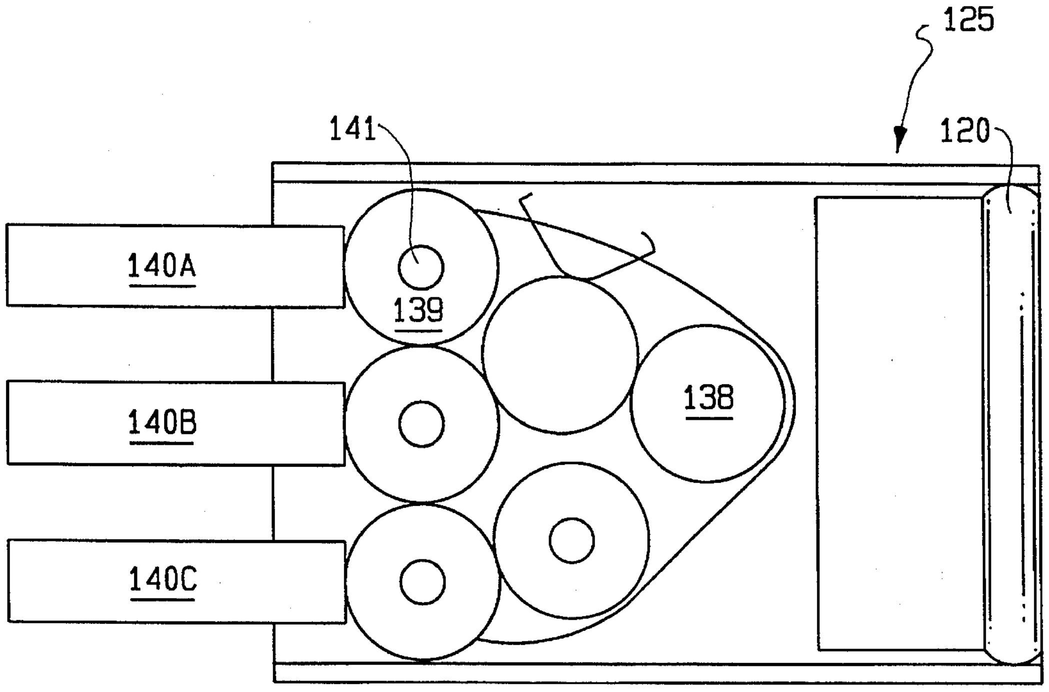
Figure 13:
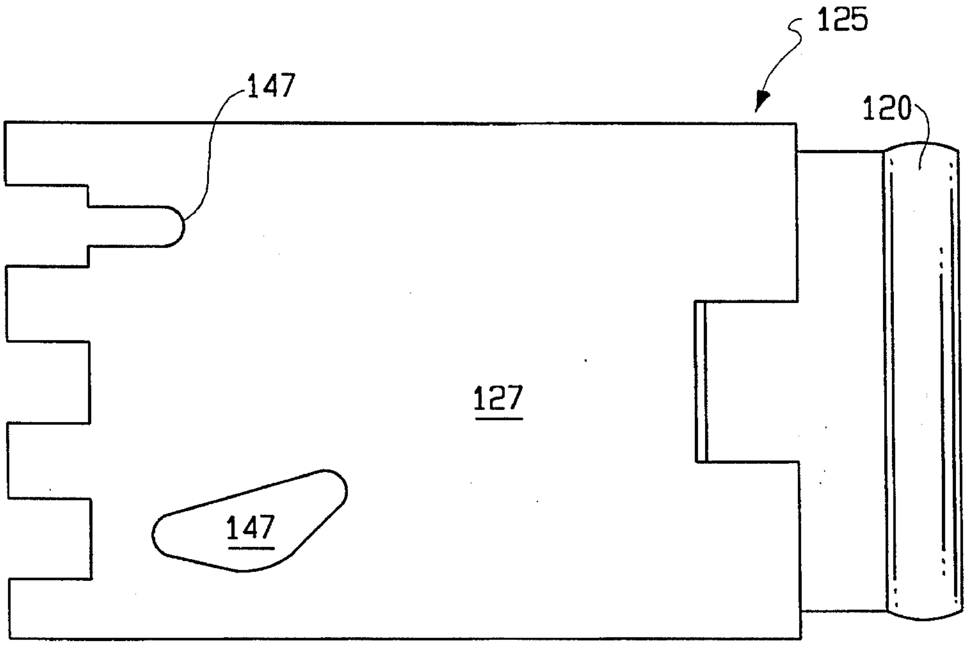

A detail of the selective actuator 125 is provided by FIGS. 12 and 13. Actuator 120 is provided in a housing having specially designed side plates 127. Certain ball bearings 139 are provided with pins 141 for movement in guide slots 147. Thus, upon movement of actuator 120, balls 138, 139 move accordingly so that the desired plate or plates 140 A,B,C move to open the lock. If the incorrect code is entered upon pressing buttons 110, the plates cannot move, because they abut non-slotted portions of the button stems. Guide slots 147 allow movement of bearings 139 only in certain directions to provide additional control over which plates 140 A,B,C are moved.

To reset the lock, knob 190 is depressed. This causes latch 180 to release all buttons which were previously depressed.

Figure 14:
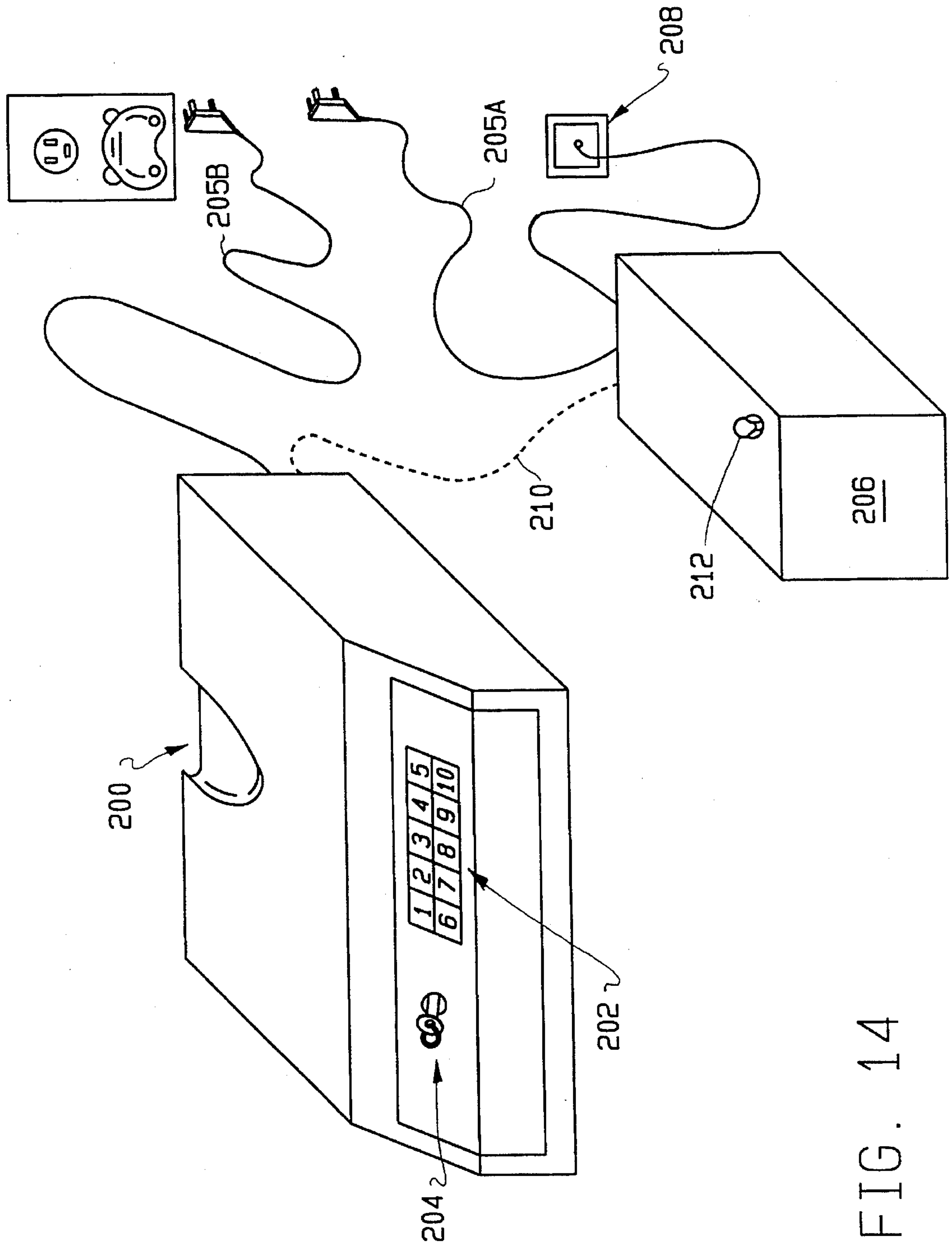
FIG. 14 is a view of a third embodiment of the invention in the form of a separate repository and base unit.
Figure 15:
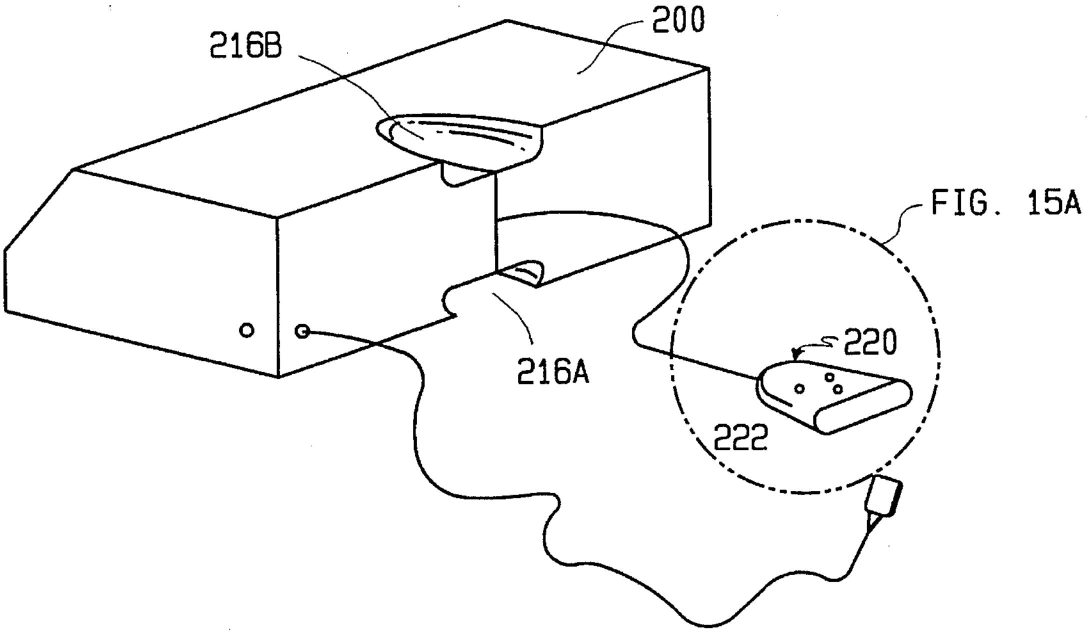
FIG. 15 is a rear perspective view of the repository of FIG. 14 to illustrate a theft deterrent device for use therewith.
Figure 15A:
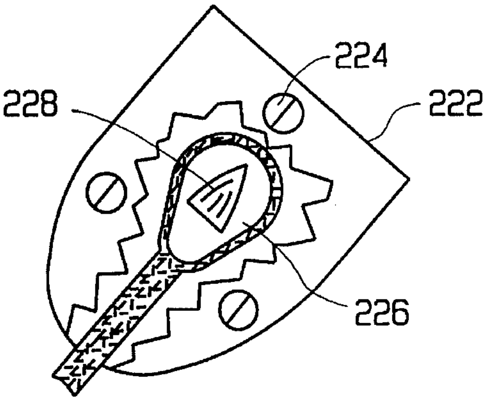
FIG. 15A is a partially cut away view of the theft deterrent device of FIG. 15.
Figure 16:
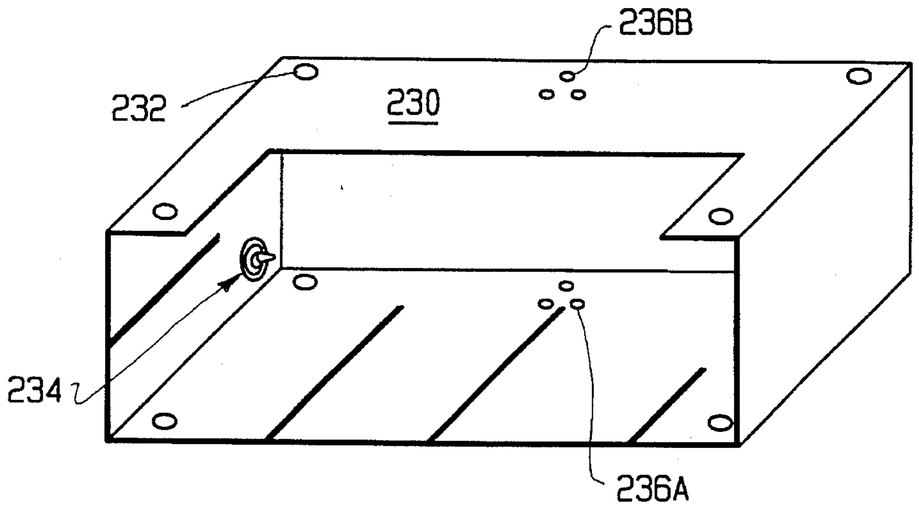
FIG. 16 is a perspective view of a mount for use with the repository of FIG. 14.

Another embodiment of the invention is shown in FIGS. 14–16. In these Figures, repository 200 includes keypad 202 and key bypass 204. If desired, a pushbutton lock as described above can be used instead of key bypass 204 to open the mechanical lock without using the keypad. The keypad and key lock components function as described above to send the appropriate emergency or non-emergency signal, or to avoid sending any signal, such as when access to the firearm is desired for cleaning or the like.

The electronic components are provided in a base unit 206, which includes a phone jack 208 for connection to the telephone system. The signals may be sent from the transmitter in the repository 200 in the form of a radio link, or can be connected by hard wiring 210 depending upon the locations of the units and the preferences of the user. Both the base unit 206 and the repository can be powered by electrical current through lines 205A,B respectively. Base unit 206 may include an indicator light 212 to signify that the unit is on as well as to signify what type of signal is to be sent.

For example, in a business setting, the repository can be placed in one location, such as the office of an executive of the company, while the base unit can be placed in another location, such as within the view of security personnel. In this arrangement, a steady light can be used to indicate normal operation of the unit and secure retention of the firearm. An emergency situation can be indicated as a fast pulsating light, a non-emergency condition as a slow pulsating light and a duress condition as a broken, fast pulsating light. Optionally, an audio alarm can be used to accentuate the visual signals. Thus, the security personnel can monitor the executive's access to the firearm.

FIGS. 15 and 16 illustrate theft deterrent features which prevents removal of repository from its appropriate location.

In FIG. 15, this device 220 includes a housing 222 which is secured to a wall or floor behind repository 200 by the use of securing means 224, such as screws or the like. Device 222 also includes looped wire 226 and conductor 228, such that upon withdrawal of the repository, wire 226 contacts conductor 228 and thus sends an emergency signal.

Device 220 is preferably not visible from the front of the unit, so that it cannot be disconnected. Even if device 220 is disconnected and carefully handled to avoid sending a signal, removal of the repository by disconnection of electrical cord 205B will cause indicator light 212 of base unit 206 to go out. This can also be used to generate an audio alarm which indicates that an attempt at removal or a power loss has occurred at the repository.

FIG. 16 illustrates another theft deterrent device, this one in the form of a housing mount 230, which is securely attached to the wall, floor or ceiling of a structure, such as a room or building. Through the use of suitable fastening means and connection holes 232 mount 230 can also be attached above or below a horizontal surface, such as a counter, desk or table. When so attached to any structure, housing cannot be removed without the use of extensive and excessive force. Since the mount remains too difficult to remove, the repository is designed to be slidably received in the mount and retained there by spring loaded pins 234 so that it can be removed when authorized and necessary. Device 220 can be attached to housing 230 at holes 236A or B. Repository 200 can include recesses 216A, B which receive device 220. Thus, upon unauthorized or improper removal of repository 200, device 220 will send the appropriate alarm signal. For authorized removal, operation of the key or pushbutton lock release will also release the spring lock pins. Alternatively or in addition to device 220, spring loaded pins 234 can be configured and designed to transmit an alarm signal when removal of repository 200 from mount 230 is improper or unauthorized.

Figure 17:
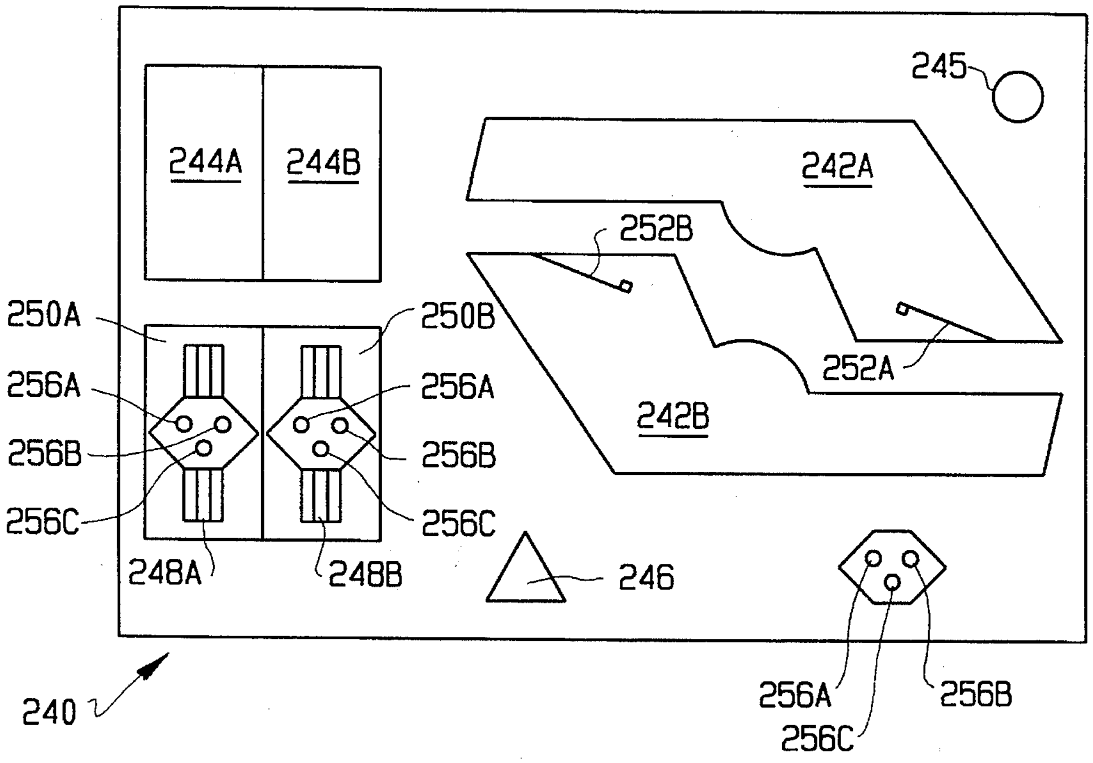
FIG. 17 is a top view of a drawer or repository chamber for retaining a plurality of weapons and corresponding patrol or monitoring bracelets.

One preferred arrangement for the internal space of the repository or drawer is shown in FIG. 17. In this Figure, drawer 240 includes the appropriate number of recesses, in this case two, 242A, B, to receive handguns and magazine wells 244A, B. Recesses 242A, B are configured to be large to accommodate handguns of different size, or can be custom designed to precisely accommodate the specific weapon or weapons to be stored. A desiccant well 245 can be provided to retain a desiccant or other moisture absorbing material so that a dry environment can be retained in the repository. A signal transmission light 246 can be included to provide visual verification of the type of signal that is sent. For example, light 246 can operate in the same manner as light 212 of base unit 206.

When the handguns are to be accessed routinely at periodic intervals, another feature of the invention can be provided. As shown in FIG. 17, bracelets 248A, B, mounted in wells 250A, B and corresponding to handguns A and B, are provided. This allows for accountability and tracking of the firearms when removed from the drawer. In this embodiment, after access is made to the weapons, the weapon can be removed and retained by the user for patrols, security investigations or the like. The handgun recess includes switches 252A, B which are depressed when the handguns are received in the recess. In the event that the handgun is removed without first removing a bracelet, an unauthorized access alarm is transmitted to the base unit. However, since routine access to the firearm is contemplated, initial removal of a bracelet is required to indicate a normal mode of operation. In an emergency situation, all the user needs to do is remove the handgun and the emergency alarm is automatically sent. Alternatively, a switch can be depressed prior to removal of the handgun whereas the depression of the switch releases the weapon and signals that an authorized removal has been made.

Upon removal of bracelet and handgun, the user can then conduct the necessary patrol or investigation, with the bracelet including emergency transmission buttons 256A, B, C for informing the central station or base unit of an emergency, duress or life threatening situation. These buttons can be made more complex, such as to require the depression in a certain sequence or code, or a keypad can be instead included, the operation of which would be the same as above for the first embodiment. Since access to the weapon is presumably made under authorized conditions, there is no need for particular codes or sequences for bracelet buttons 256A, B, C. For correction of an incorrect signal or for deletion of the signal due to the incorrect removal of the weapon from the recess, the chamber includes a similar pushbutton device for entering codes or signals. Of course, bracelets 248A, B are intended to be worn on the wrist of the user, and the buttons can also be used to call for additional or backup assistance.

Figure 18:
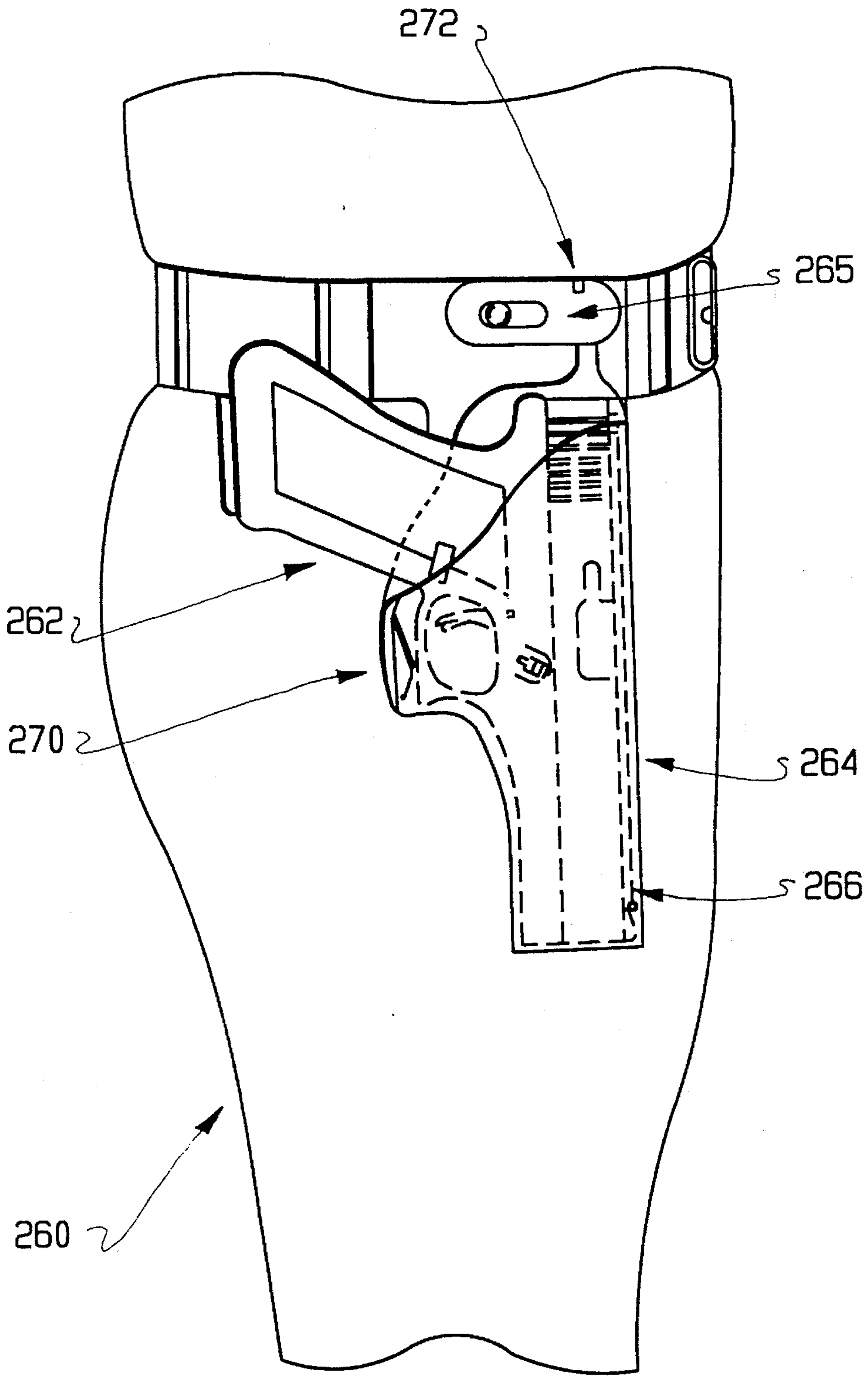
FIG. 18 is another embodiment of a patrol related firearm security system in the form of a gun holster.

FIG. 18 illustrates an alternative system whereby, instead of a patrol bracelet, a patrol belt is utilized after the handgun is removed from the repository. As shown, belt 260 includes gun 262, which is securely received in holster 264, and transmitter 265, which allows for tracking of the position of the weapon in the same manner as the "Lo-Jack" car security devices. Thus, the position of the patrol officer can be monitored by the central station or the base unit. Transmitter 265 is designed to transmit an emergency signal through antenna 266 if emergency button 268 is depressed by the officer. This could be used to transmit a signal which indicates that a situation having potentially dangerous consequences has been encountered but that the officer's weapon has not yet been withdrawn. A pressure switch 270 can be provided in holster 264 such that, as weapon 262 is withdrawn from holster 264, switch 27 opens (or closes) to cause transmitter 265 to send a signal indicative of the removal of the weapon. If desired, a monitor light 272, which is inconspicuous to other than the user, can be provided to indicate sufficient battery power and proper functioning of the transmitter.

Both the patrol bracelet and belt include transmitters having sufficient range to allow the user to patrol a particular vicinity or area. The patrol of areas outside of the range of the transmitter can be processed by the central station or the base unit as an indication of a problem, such as the officer's pursuit of a suspect, or that the officer has improperly exited the patrol territory. Upon notification of this situation, the central station or base unit monitoring personnel can take appropriate action.

In another version of this embodiment, the firearm can be accessed by entering an emergency code and then removing the bracelet or belt. No signal will be transmitted until the transmitter is activated such as by the officer entering the range of the central station or base unit in the area to be patrolled.

An alternative design for the holster would operate as follows. The withdrawal of the firearm from the holster in a normal fashion for more than three seconds will cause a detachable, rechargeable component of the holster to transmit an emergency signal cellularly and also transmit a signal that is trackable by radar. These functions allow the user to instantly notify the security or law-enforcement agency (monitoring the holster system) that they have withdrawn their firearm for defense and that they may be located to provide for police back-up. If the user is unsure that they are in danger and do not yet wish to send an "emergency" signal, they may push the switch on the transmitter forward and withdraw the firearm. This will only send a "non-emergency" signal without a tracking signal, or send no signal at all, depending on the purpose for which the holster is designed. When the user is certain that they do in fact need police assistance, they need only push the switch forward on the transmitter after the firearm has been withdrawn under the previously set forth conditions.

Replacement of the firearm in the holster will immediately stop the transmitter from sending the tracking signal, indicating that the user is not in danger.

To withdraw the firearm in an intentional, but non-emergency manner, a switch on the detachable re-chargable transmitter is pushed forward with the thumb. The switch will then spring back into its original position. The system will then either transmit a non-emergency" signal without sending a tracking signal, or send no signal at all. The design for private citizens will provide the "non-emergency" signal. The specific design for the police and military can be chosen according to their particular rules and regulations.

A low-profile indicator light on the transmitter indicates that the system is on when tested (by pushing forward the switch). Also, when either of the two possible signals are sent, they would be differentiated by the rapidity of the pulsing light, fast pulse indicating "emergency" and a slow pulse indicating "non-emergency". The holster would require proper cleaning, and the detachable rechargeable transmitter would need regimental recharging (approximately every 24 hours if used continually). It goes without saying that this system is vitally important to the future of law-enforcement and the proper manner in which privately owned and legally carried firearms are kept on one's person.

While there has been shown and described what are considered to be preferred embodiments of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. A firearm security system comprising a repository having a housing which defines an internal space which receives at least a portion of at least one firearm therein; a firearm received in the repository; means for transmitting a first alarm signal indicative of an emergency condition upon removal of the firearm from the repository; means operatively associated with the repository and the first alarm signal transmitting means for overriding the first alarm signal transmitting means to prevent transmission of the first alarm signal and instead transmit a second alarm signal indicative of authorized access to the firearm; and means for transmitting a third alarm signal independently of the removal of the firearm from the repository.

2. A firearm security system as claimed in claim 1 wherein the repository includes a recess for receiving the firearm and switch means for transmitting the first alarm signal.

3. A firearm security system as claimed in claim 2 wherein the repository recess includes a switch means which engages upon removal of the firearm to automatically transmitting the first alarm signal.

4. A firearm security system as claimed in claim 1 wherein the repository includes a switch which can be depressed for transmitting the second signal.

5. A firearm security system as claimed in claim 4 wherein the repository comprises a holster and the means for sending the first alarm signal comprises a switch operatively associated with the firearm for engagement upon withdrawal of the firearm from the holster.

6. A firearm security system as claimed in claim 4 wherein the switch for sending the second alarm is mounted upon a bracelet.

7. The firearm security system according to claim 6 wherein the holster further includes a transmitter for monitoring movement of the holster throughout a predetermined patrol area.

8. The firearm security system according to claim 1, wherein the first alarm signal transmitting means comprises a switch in the internal space which is depressed when the firearm is placed therein and which transmits an emergency signal as the first alarm signal when the switch opens as the firearm is removed unless the overriding means is accessed prior to removal of the firearm.

9. The firearm security system according to claim 1 wherein the overriding means comprises a bracelet; the repository comprises a drawer which includes at least a first well for the firearm and a second well for the bracelet; the first alarm signal is transmitted when the firearm is removed from the first well without first removing the bracelet; and the second alarm signal is transmitted when the bracelet is removed prior to removal of the firearm from the first well.

10. The firearm security system according to claim 9 wherein the third alarm signal is an emergency signal and the third alarm signal transmitting means is located on the bracelet.

11. The firearm security system according to claim 9 wherein the third alarm signal transmitting means is located on the bracelet and comprises a pushbutton mechanism for transmitting, as the third alarm signal, an alarm signal for correcting or deleting an improperly transmitted first alarm signal.

12. The firearm security system according to claim 1 wherein the overriding means comprises a switch; the repository comprises a drawer which includes a well for the firearm; the first alarm signal is transmitted when the firearm is removed from the well without first actuating the switch; and the second alarm signal is transmitted when the switch is actuated prior to removal of the firearm from the well.

13. The firearm security system according to claim 12 wherein the first alarm transmitting means includes a time delay prior to transmitting the first alarm signal, and the override means can be actuated to override the transmission of the first alarm signal before the time delay elapses.

14. The firearm security system according to claim 12 wherein the drawer includes two first wells for receiving two firearms each of which is a handgun.

15. The firearm security system according to claim 1 wherein the repository is a handgun holster; the second alarm signal means comprises an override button on said holster; and further comprising a wrist bracelet operatively associated with the holster such that the third alarm signal transmitting means is located on the wrist bracelet, wherein depression of the override button prior to removal of the handgun from the holster causes the second alarm signal to be transmitted, whereas removal of the handgun from the holster without first depressing the override button causes the first alarm signal to be transmitted.

16. The firearm security system according to claim 1 wherein the housing comprises a holster and the first alarm transmitting means includes a transmitter having a predetermined range, so that movement of the holster outside of the predetermined range causes the first alarm signal transmitting means to transmit the first alarm signal.

17. The firearm security system according to claim 1 wherein the firearm is a handgun and the internal space of the repository is configured to receive the entire handgun therein.

18. The firearm security system according to claim 1 wherein the internal space of the repository receives at least the trigger-actuating portion of the firearm.

19. The firearm security system according to claim 1 wherein the first, second and third alarm signal transmitting means transmit their respective alarm signals to a police station or security service locale and the repository includes means for generating an alarm signal in the event of a power loss or an attempt at removal of the repository.

20. The firearm security system according to claim 19 wherein the third alarm signal transmitting means comprises a panic button which is manually engaged to send an emergency alarm as the third alarm signal.

* * * * *